US008761773B2

(12) United States Patent
Patini

(10) Patent No.: US 8,761,773 B2
(45) Date of Patent: *Jun. 24, 2014

(54) GSM RESCUE HANDOVER UTILIZING ADAPTIVE MULTIRATE HALF-RATE

(75) Inventor: Joseph James Patini, Woodstock, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,081

(22) Filed: Jun. 19, 2012

(65) Prior Publication Data

US 2012/0264432 A1    Oct. 18, 2012

Related U.S. Application Data

(63) Continuation of application No. 11/687,918, filed on Mar. 19, 2007, now Pat. No. 8,224,326.

(51) Int. Cl.
*H04W 36/00* (2009.01)
*H04W 72/00* (2009.01)

(52) U.S. Cl.
USPC .......................................... 455/436; 370/332

(58) Field of Classification Search
USPC .......... 455/436, 450, 445; 370/230, 233, 235, 370/237
See application file for complete search history.

(56) References Cited

U.S. PATENT DOCUMENTS

| 5,787,346 | A | * | 7/1998 | Iseyama ...................... 455/439 |
| 5,920,597 | A | * | 7/1999 | Khayrallah et al. .......... 375/265 |
| 5,940,763 | A | | 8/1999 | Alperovich et al. |
| 6,073,020 | A | | 6/2000 | Andresen |
| 6,112,089 | A | | 8/2000 | Satarasinghe |
| 6,389,285 | B1 | | 5/2002 | Escamilla et al. |
| 6,608,827 | B1 | * | 8/2003 | Austin ......................... 370/348 |
| 2001/0021175 | A1 | * | 9/2001 | Haverinen ..................... 370/230 |
| 2002/0057667 | A1 | * | 5/2002 | Hamalainen et al. ......... 370/347 |
| 2004/0023618 | A1 | | 2/2004 | Hakalin et al. |
| 2004/0233903 | A1 | * | 11/2004 | Samaras et al. ............... 370/389 |
| 2005/0117533 | A1 | | 6/2005 | Cave |
| 2005/0233753 | A1 | | 10/2005 | Hamabe et al. |
| 2006/0079263 | A1 | | 4/2006 | Kondo |
| 2006/0246938 | A1 | | 11/2006 | Hulkkonen et al. |
| 2007/0047569 | A1 | * | 3/2007 | Das et al. ..................... 370/443 |

OTHER PUBLICATIONS

OA dated Mar. 16, 2010 for U.S. Appl. No. 11/687,918, 21 pages.
OA dated Sep. 16, 2010 for U.S. Appl. No. 11/687,918, 24 pages.

* cited by examiner

*Primary Examiner* — George Eng
*Assistant Examiner* — Joseph Dean, Jr.
(74) *Attorney, Agent, or Firm* — Amin, Turocy & Watson, LLP

(57) ABSTRACT

Call handover in a cellular telecommunication system is improved by adjusting a rate-based parameter, such as that controlled by an adaptive multi-rate (AMR) codec in a time-division multiple access (TDMA) network, to increase call handling capacity when handover is indicated but the candidate handover cell does not have sufficient capacity to handle another call.

20 Claims, 4 Drawing Sheets

GSM RESCUE HANDOVER UTILIZING ADAPTIVE MULTIRATE HALF-RATE

CROSS-REFERENCE TO RELATED APPLICATION

This patent application is a continuation of U.S. patent application Ser. No. 11/687,918, filed Mar. 19, 2007, and entitled, "GSM RESCUE HANDOVER UTILIZING ADAPTIVE MULTIRATE HALF-RATE," the entirety of which is incorporated by reference herein.

BACKGROUND OF THE INVENTION

1. Field of the Invention

The present invention relates generally to wireless mobile telecommunication networks and, more specifically, to the handoff or handover of a mobile station from one cell to another.

2. Description of the Related Art

"Handoff" or "handover" is a term that refers to the process or method by which a cellular telecommunication network passes the task of serving a mobile telephone handset, wireless data device, or other such mobile station (MS) from one base station radio transceiver to another. Handover is generally performed for one of two reasons. The first and most common reason is to maintain a user operating a MS in wireless (radio) communication as the user moves from one geographic area served by the network to another. A cellular communication network comprises numerous adjacent cells, each of which is defined by a base station or Base Transceiver Station (BTS) that can serve, i.e., communicate with, any active MS within a certain reception range or range within which good signal quality and strength can be expected. The cells are thus roughly circular in shape, with their diameters defined by this range, and generally overlap adjacent cells to some extent. Nevertheless, for convenience, cells are typically graphically represented on geographic network maps as interconnected polygons, most commonly hexagons. As the MS moves away from the BTS, i.e., toward the cell edge or boundary, the signals communicated between the MS and the BTS fade or otherwise degrade. One or more network entities monitor signal quality, strength or similar measurement of how "good" a signal is between the MS and each of the various cells in the vicinity of the MS. The measured quantities are compared with one another to identify the cell with which the MS communicates the highest quality or otherwise "best" signals. If it is determined that another cell would communicate better signals than the cell currently serving the MS, the MS is handed over from the then-serving cell to the other cell. That is, the cell to which the network hands over the MS begins serving the MS, and the cell from which the network hands over the MS ceases to serve the MS. Such a handover may occur again from time to time as the MS moves about.

Another reason for performing handover is to balance the load among the BTS's so that one BTS is not overloaded with calls while another that is capable of handling one or more of those calls remains underutilized. Some cellular networks are configured to hand over a MS from the serving BTS to another BTS when the serving BTS is serving many more MS's than the other BTS.

The network element that monitors the signals and is primarily responsible for the decision whether to hand over a MS to a different cell depends upon the network type (e.g., GSM, UMTS, CDMA, etc.), but in many networks the element is known as a Base Station Controller. An analogous network entity is known as a Radio Network Controller (RNC) in the context of other types of networks. For purposes of this patent specification, the term "Base Station Controller" (BSC) includes within its scope not only that which is commonly referred to as a BSC but also that which is commonly referred to as an RNC and all such other analogous network elements. Likewise, for purposes of this patent specification, the terms "Base Transceiver Station" (BTS) and "Base Station" (BS) are intended to include not only network elements that are commonly referred to by those terms but also other such elements that serve analogous functions in the context of other cellular network types. The BSC includes processing logic that performs an algorithm involving the above-mentioned signal comparison. Various handover algorithms are known in the art. One well-known example of such an algorithm is known as Mobile Assisted Handoff (MAHO). In the MAHO algorithm, signal strength and quality of the voice signals the MS is receiving from its serving cell, plus the control signals of neighboring cells, are compared with each other, in part by the UE itself, to determine the best cell to serve the MS.

A successful handover involves a coordinated process in which the serving BTS relinquishes control over the UE, and the BTS to which the MS is handed over takes control and establishes communication with the MS in an essentially seamless manner, such that a call in progress can continue uninterrupted. Unsuccessful handover can result in a dropped call, i.e., a situation in which the call is permanently disrupted because no communication link relating to the call remains between the MS and any BTS.

"Emergency handover" or "rescue handover" is a term that has been applied to the situation in which the BSO or other handover decision-making entity determines that a call must be handed over immediately in order to avoid it being dropped. Although handover decisions are most commonly based upon signal quality measurements, a rescue handover decision is typically based upon signal strength alone. That is, if the BSC determines that the strength of signals received from the MS have fallen below a threshold necessary to maintain the communication link, the BSC initiates a rescue handover from the serving BTS to any other BTS that is capable of handling the call, even though conditions do not otherwise indicate that "normal" handover is to occur.

A situation can occasionally occur when a BSC determines that rescue handover should occur but there is no BTS with available capacity to handle the call, i.e., all candidate BTS's are fully loaded handling other calls. Such a situation often results in a dropped call.

It would be desirable to enhance existing handover methods so that fewer calls are dropped. The present invention addresses this problem and others in the manner described below.

SUMMARY OF THE INVENTION

The present invention relates to a system and method for improving handover of a call in a cellular telecommunication system when handover is indicated but the candidate handover cell does not have sufficient capacity to handle another call. In such a circumstance, the call capacity of the candidate cell can be increased by adjusting a rate-based parameter before handing over the call to the candidate cell.

In an exemplary embodiment of the invention, the network is of a time-division multiple access (TDMA) type, in which the call capacity of each cell is defined, by a predetermined number of timeslots per frequency channel, and each timeslot can be used to handle one call. In such a network type, call capacity of the candidate cell can be increased by dividing at least one of the timeslots into a plurality of sub-rate timeslots. For example, Half-Rate/Full-Rate (HR/FR) Adaptive Multi-Rate (AMR) coder-decoders (codecs) are used in some conventional networks of this type to maximize call capacity under certain conditions by switching to HR mode, in which a FR timeslot is divided into a plurality of HR timeslots. The present invention can provide an additional control input for the codecs, instructing a codec to switch to HR mode under the additional condition of handover being indicated but the candidate handover cell not having an unused timeslot in which it could handle another call.

DETAILED DESCRIPTION

Figure 1:
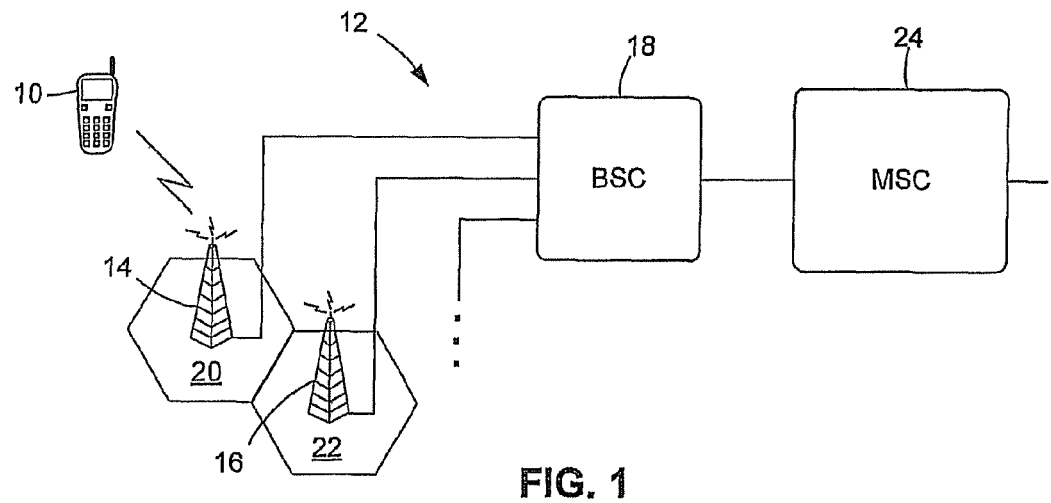
FIG. 1 is a block diagram of a portion of a wireless mobile telecommunication network in accordance with an exemplary embodiment of the present invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

As illustrated in FIG. 1, a Mobile Station (MS) 10 can communicate via a radio communication link with a wireless cellular telecommunications network 12. In this exemplary embodiment of the invention, the illustrated network is of the Global System for Mobile Telecommunications (GSM) type, in which the radio communication link uses the time-division multiple access (TDMA) principle for accommodating multiple calls, but in other embodiments the network and associated Mobile Stations can be of any other suitable type that has a suitable time-division aspect with a sub-rate mode. As described in further detail below, the invention improves handover of a call involving MS 10 by adjusting the rate of one or more timeslots or otherwise adjusting a suitable rate-based parameter in the handover candidate cell to accommodate the call before handing over the call. The invention can be used, for example, under circumstances known as emergency handover or rescue handover, where it has been determined that the call needs to be handed over because it is in danger of being dropped due to insufficient radio communication link signal strength, but the call cannot conventionally be handed over to a handover candidate cell without exceeding the cell's call handling capacity. In conventional networks, such a circumstance of needing to hand over a call but having no handover candidate cell capable of accepting the call often results in a dropped call.

Network 12 includes a plurality of Base Transceiver Stations (BTS) 14, 16, etc., which are in turn controlled by one or more Base Station Controllers (BSC) 18. Each BTS 14, 16, etc., is associated with or defines a corresponding cell 20, 22, etc., respectively. In the context of call handover, the terms "Base Transceiver Station" and "cell" may be used synonymously or equivalently for purposes of clarity and convenience. It is understood in the art, and as used herein, that reference to handing over a call from one cell to another refers to passing the task of serving a MS from one BTS to another. Also, although the term "cell" is used herein for convenience to refer to the zone or region to and from which a call is handed over, the term as used herein broadly includes within its scope all such regions, such as sectors. For example, a reference to handing over a call from one cell to another includes within its scope handing over a call from one sector to another.

BSC 18 and any other associated Base Station Controllers (not shown), in turn, communicate with a Mobile Switching Center (MSC) 24 that provides the logic and switching circuitry for directing calls to and from Mobile Stations as well as logic for inter-BSC handover. Although for purposes of illustration in the example described below handover occurs between exemplary cells 20 and 22, which are controlled by the same BSC 18 and same MSC 24, the present invention likewise applies to handover between cells (not shown) controlled by different BSC's or different MSC's.

Figure 2:
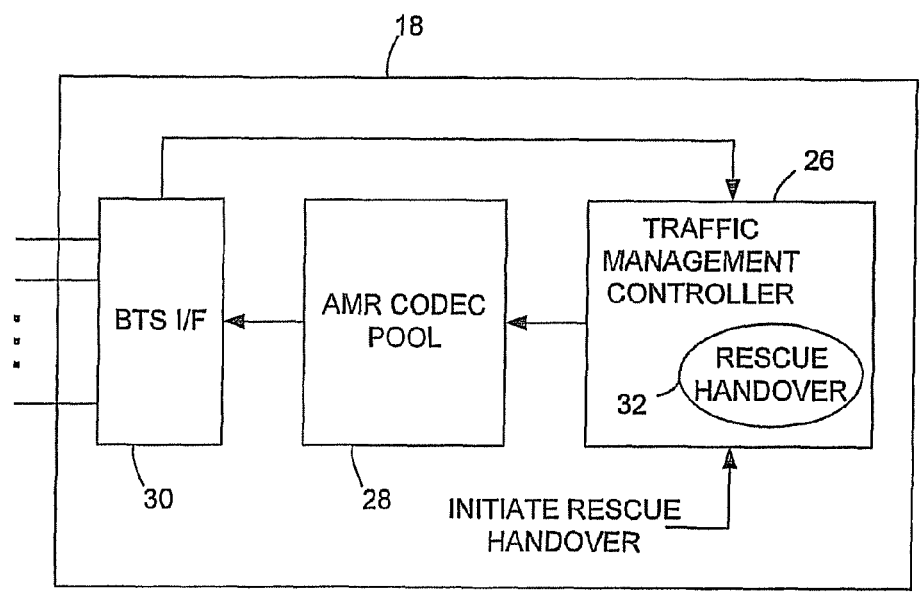
FIG. 2 is a block diagram of a Base Station Controller of the network shown in FIG. 1.
Figure 3:
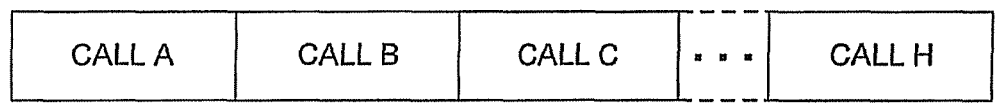
FIG. 3 illustrates Full-Rate timeslots for handling calls in the network shown in FIG. 1

As illustrated in FIG. 2, an exemplary BSC 18 includes a traffic management controller 26, a plurality of adaptive multi-rate (AMR) coder-decoders (codecs) 28, and a BTS interface 30. BTS interface 30 provides the interface to the various BTS's 14, 16, etc., that are under the control of BSC 18. The combination of traffic management controller 26 and AMR codecs 28 (and which may include additional elements not directly related to the present invention and thus not shown for purposes of clarity) defines a channel control system that controls the assignment of calls to corresponding timeslots in a frequency channel in accordance with the well-known TDMA protocol. As known in the art, in a GSM network each codec typically provides eight timeslots per frequency channel, as shown in FIG. 3. For example, as shown in FIG. 3, each of eight calls, denominated "Call A," "Call B," "Call C," etc., can be assigned to one of the timeslots of one of AMR codecs 28. Traffic management controller 26 controls AMR codecs 28 to determine which timeslots are available to handle new calls, assign new calls to available timeslots, de-assign calls from timeslots when calls terminate, and perform other conventional functions. Accordingly, when a call is handed over to a cell under the control of BSC 18, traffic management controller 26 is responsible for assigning it to an available timeslot. The manner in which this occurs is well understood in the art and thus not described in further detail herein.

Traffic management controller 26 also performs the conventional function of controlling the encoding rate of AMR codecs 28. Under certain predetermined circumstances that can involve the quality of network conditions (and associated likelihood of bit errors), network traffic volume and other factors, traffic management controller 26 instructs AMR codecs 28 to switch one or more timeslots from Full Rate to Half Rate. Basically, better network conditions allow more bandwidth to be allocated to speech encoding and less to error protection, while poorer network conditions militate more bandwidth be allocated to error protection. In a GSM system, Full Rate is typically 22.8 kilobits per second (kbps), and Half Rate is typically 11.4 kbps. The channel control system adapts the coding to maximize the number of calls the Base Station Controller can handle under the current network conditions without dropping calls or compromising call quality to an unsatisfactory extent. Note that, in effect, each of AMR codecs 28 can in principle handle up to eight calls at Full Rate or up to 16 calls at Half Rate. For purposes of convenience and illustration, timeslots can be referred to as either Full Rate or Half Rate, with a Half Rate timeslot being half as long as a Full Rate. Note that traffic management controller 26 can control each timeslot of each of AMR codecs 28 independently, such that some timeslots can be Half Rate while others are Full Rate. As described below, the present invention uses the conventional AMR coding technology to enhance handover and may be especially useful in enhancing rescue handover.

Figure 4:
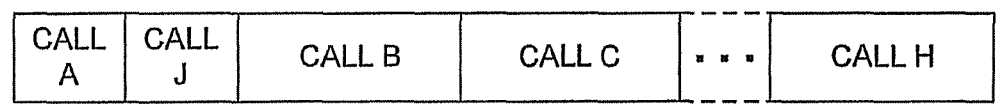
FIG. 4 is similar to FIG. 3 but shows an instance in which one of the timeslots has been divided into two Half-Rate timeslots.

Although not shown for purposes of clarity, BSC 18 includes additional elements that control the handover process itself, either independently of MSC 24 in the case of handover between BTS's that are both controlled by BSC 18, or in conjunction with MSC 24 in the case of handover between BTS's that are controlled by two different BSC's controlled by MSC 24 (though only one BSC 18 is shown in FIG. 1 for purposes of clarity). "Normal" (i.e., non-rescue) handover is initiated and performed in the conventional manner. That is, a determination whether to hand over MS 10 to a candidate cell is made based upon comparisons of signal quality, strength or similar measurement of how "good" a signal is between MS 10 and each of the various cells in the vicinity of MS 10. The exemplary embodiment of the invention relates to rescue handover. In the exemplary embodiment, initiation of a rescue handover under conditions in which the handover candidate cell lacks an available timeslot to receive the call can trigger traffic management controller 26 to switch at least one of the Full timeslots to Half Rate (i.e., divide it in half), thereby effectively creating a new timeslot to which the call can be assigned. For example, comparing FIG. 4 with FIG. 3, the first timeslot shown in FIG. 3 has been switched to Half Rate (i.e., divided in half) in FIG. 4. As part of the handover process, traffic management controller 26 assigns the newly handed-over "Call J" to the new timeslot. Thus, the Full-Rate timeslot formerly occupied by only data relating to Call A is now divided into two Half-Rate timeslots occupied by data relating to both Call A and Call J. Although only one timeslot has been shown divided in this example, any suitable number of timeslots can be divided in this manner. The manner in which the call data is packed into or formatted in a timeslot is well understood in the art and therefore not described herein.

Note that traffic management controller 26 is essentially a processor system, having one or more processors, memories, etc. (not shown for purposes of clarity), which can be programmed with suitable software or firmware or otherwise configured with logic to perform the methods of the present invention along with the conventional functions described above. A rescue handover software element 32 is shown in FIG. 2 for purposes of illustration as stored in or residing in traffic management controller 26 to indicate that traffic management controller 26 operates in part under control of such an element. Other, conventional software elements that are typically included in a BSC can be included in BSC 18 but are not shown for purposes of clarity.

Figure 5A:
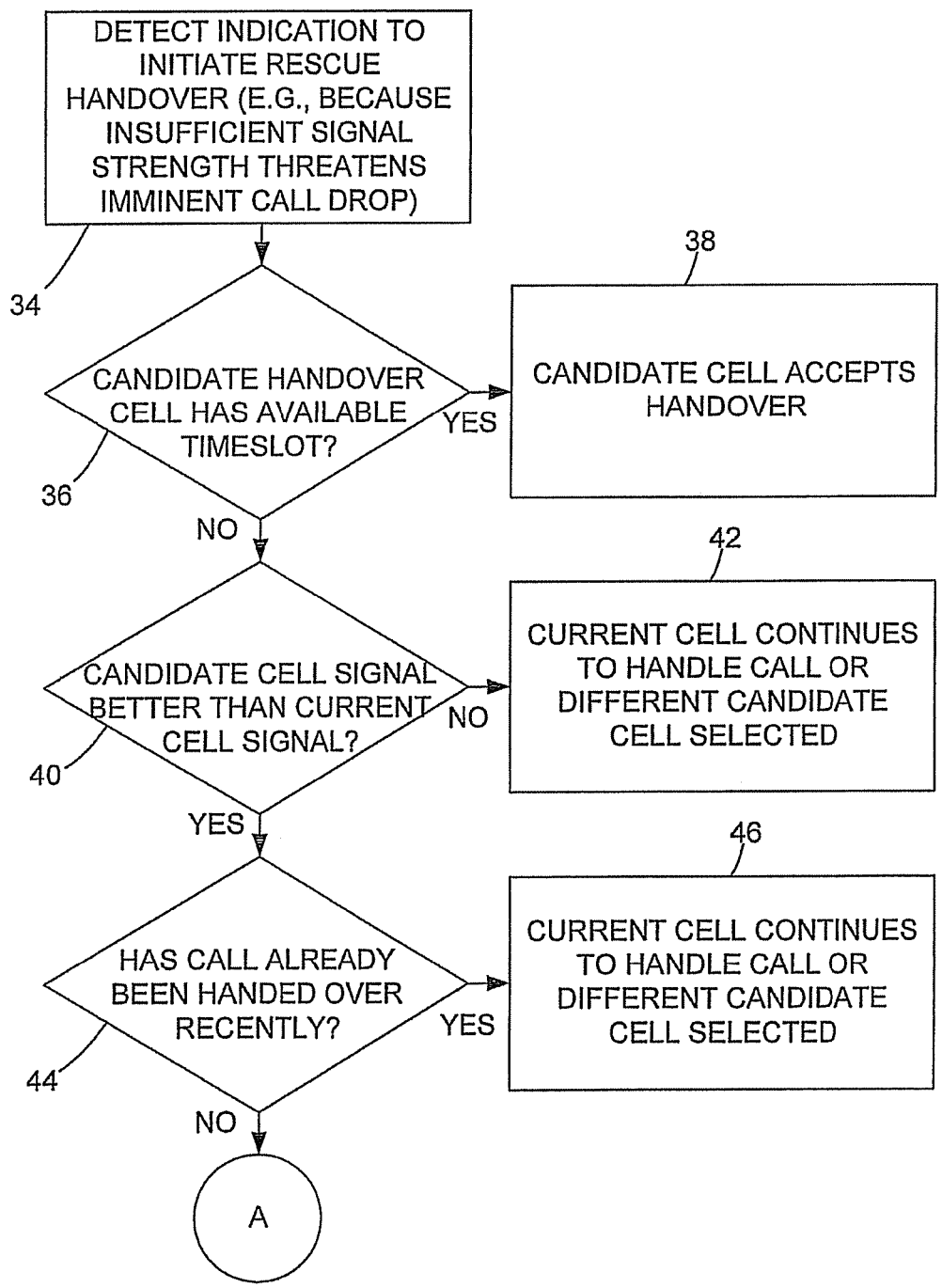
FIG. 5A is a flow diagram illustrating a handover method in the network of FIG. 1.
Figure 5B:
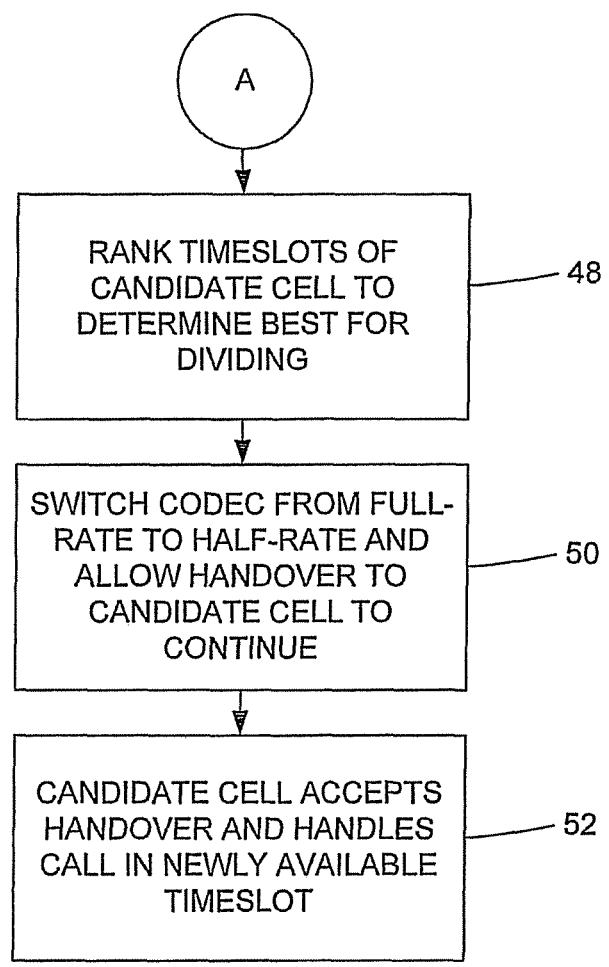
FIG. 5B is a continuation of the flow diagram of FIG. 5A.

Accordingly, traffic management controller 26, under control of rescue handover software element 32, performs the method illustrated in FIGS. 5A-B. At step 34, traffic management controller 26 detects an indication to initiate rescue handover. As known in the art, a BSC typically initiates rescue handover when the strength of signals communicated between the currently serving cell and a Mobile Station fall below a predetermined threshold, indicating that the call is likely to be dropped unless handover occurs immediately. Traffic management controller 26 can monitor for and detect when BSC 18 initiates rescue handover. As an example, MS 10 currently may be served by cell 20 (FIG. 1) when BSC 18 determines that rescue handover needs to occur due to fading of the signal from MS 10.

At step 36, traffic management controller 26 determines whether the call can be handed over from the current cell to a candidate cell without exceeding the call capacity of the candidate cell. As described above, the call capacity is determined by the number of available timeslots. BSC 18 can determine handover candidate cells in the conventional manner. For example, it may determine that cell 22 is a candidate cell (also sometimes referred to in the art as a "target cell") for rescue handover. If one of the codecs 28 serving cell 22 has an available timeslot, then rescue handover can proceed in the conventional manner, as indicated by step 38. If none of the applicable codecs 28 has an available timeslot, then the timeslot-dividing steps described above can be performed to create new timeslots to handle the call.

Additional filter criteria can be applied to avoid unnecessary, excessive or otherwise undesirable rescue handover and timeslot division. At step 40, traffic management controller 26 can determine whether handing over MS 10 to the candidate cell would result in poor signal communication. The same or similar measurements as conventionally used in handover decisions can be used at step 40, such as frame error rate (FER), received signal quality (RXQUAL), received signal level (RXLEV), etc. If the signal between MS 10 and the candidate cell is not better than the signal between MS 10 and the cell currently serving MS 10, then traffic management controller 26 can intervene in the handover process by causing BSC 18 to not complete the handover or, alternatively, to select a different candidate cell, as indicated by step 42.

Also, at step 44, traffic management controller 26 can determine whether the call has already undergone the process of being assigned to a newly created (i.e., Half Rate) timeslot in response to a recent (e.g., within some suitable predetermined number of milliseconds or seconds) rescue handover initiation, as it may adversely affect network performance to repeatedly perform the rescue handover method on a call. If traffic management controller 26 determines that the call has recently been the subject of a divided-timeslot rescue handover, then traffic management controller 26 can intervene in the handover process by causing BSC 18 to not complete the handover or, alternatively, to select a different candidate cell, as indicated by step 46. If traffic management controller 26 determines that the call has not recently been the subject of such a rescue handover, then one or more timeslots can be divided to allow the candidate cell to accept the call.

Further optimization can be applied before timeslot division. For example, at step 48, traffic management controller 26 can rank the timeslots of the candidate cell according to signal quality to determine the best cell or cells for timeslot division. That is, it can examine the signal quality as reported by each Mobile Station having a call handled in one of the timeslots and determine which of the timeslots has the best quality signal, as dividing that timeslot is likely to have a less adverse impact upon the quality of the calls handled by that timeslot than other timeslots.

At step 50, traffic management controller 26 instructs one of codecs 28 serving the candidate cell to switch one or more timeslots to Half Rate. Switching a timeslot from Full Rate to Half Rate increases the call capacity of the candidate cell by effectively creating an additional timeslot. At this point, traffic management controller 26 can indicate that it has completed the special rescue handover steps relating to the present invention, thereby allowing BSC 18 to continue the handover process in the conventional manner. Thus, for example, in accordance with conventional handover in a GSM network, BSC 18 causes a handover command to be transmitted to MS 10, to which it is to respond by searching for the candidate cell radio signal, such as that of cell 22 (FIG. 1). Once MS 10 is communicating with cell 22, BSC 18 receives a confirmation. BSC 18 assigns the call to the additional timeslot that, was effectively created by switching a Full Rate timeslot to Half Rate, as described above with regard to FIG. 4.

In the manner described above, the present invention helps minimize dropped calls in instances in which extremely poor radio conditions indicate a need for rescue handover of a call but target cells are heavily congested. As also described above, in some embodiments, filter criteria can be included to avoid invoking the method in certain instances. In some embodiments, optimization steps can be include to optimize the timeslot division. Embodiments of the invention can utilize conventional AMR codec features and full-timeslot-occupancy detection features already present in commercially available BSC's, thereby enabling existing BSC's to be upgraded easily or BSC designs to be improved easily.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method, comprising:
in response to determining that a strength of a signal received from a first wireless device satisfies a rescue handover criterion, determining, by a system comprising a processor, that a first wireless communication session associated with the first wireless device is to be transferred from a first cellular base station device to a second cellular base station device to prevent an interruption of the first wireless communication session;
in response to the determining that the first wireless communication session is to be transferred, determining, by the system, timing data associated with a time at which the first wireless communication session was previously assigned to a divided timeslot having a first rate that has been adjusted to accommodate the first wireless communication session; and
in response to determining that the timing data satisfies a defined timing criterion and determining that timeslots of a frequency channel employed by the second cellular base station device are occupied, modifying, by the system, a rate-based parameter of a timeslot of the timeslots that is assigned to a second wireless communication session associated with a second wireless device coupled to the second cellular base station device to facilitate a transmission of data associated with the first wireless communication session and the second wireless communication session via the timeslot, wherein the rate-based parameter controls a second rate of the timeslot.

2. The method of claim 1, further comprising:
facilitating, by the system, a transfer of the first wireless communication session from the first cellular base station device to the second cellular base station device after adjusting the rate-based parameter.

3. The method of claim 2, wherein the facilitating comprises facilitating the transfer in response to determining that a first signal quality of a first signal associated with the first wireless communication session established via the first cellular base station device is lower than a second signal quality of a second signal associated with the first wireless communication session established via the second cellular base station device.

4. The method of claim 3, further comprising:
determining, by the system, the first signal quality and the second signal quality based on a first frame error rate and a second frame error rate, respectively.

5. The method of claim 2, wherein the facilitating comprises facilitating the transfer after verifying that the first wireless communication session has not been previously transferred to the second cellular base station device within a defined time period.

6. The method of claim 1, wherein the modifying comprises dividing the timeslot into sub-rate timeslots, wherein a first bit rate of the timeslot is higher than a second bit rate of a sub-rate timeslot of the sub-rate timeslots.

7. The method of claim 6, further comprising:
reassigning, by the system, the sub-rate timeslot of the sub-rate timeslots to the second wireless communication session.

8. The method of claim 1, further comprising:
selecting, by the system, the timeslot from the timeslots associated with the second cellular base station device based on signal quality data indicative of a signal quality associated with a signal transmitted during the timeslot.

9. The method of claim 8, further comprising:
ranking, by the system, the timeslots based on information indicative of signal qualities of signals respectively transmitted during the timeslots, wherein the selecting is based on the ranking.

10. A system, comprising:
a memory to store executable instructions; and
a processor, to the memory, that facilitates execution of the executable instructions to perform operations, comprising:
in response to a determination that a strength of a signal received from a first wireless device satisfies a rescue handover criterion, determining that a first wireless communication session associated with the first wireless device is to be transferred from a first cellular base station device to a second cellular base station device to avoid a disconnection of the first wireless communication session;
in response to the determining that the first wireless communication session is to be transferred, determining timing data indicative of a time at which the first wireless communication session was previously assigned to a divided timeslot having a first rate that had been adjusted to accommodate the first wireless communication session; and
in response to determining that the timing data satisfies a defined timing criterion and determining that timeslots of a frequency channel employed by the second cellular base station device are unavailable, increasing a capacity of the frequency channel based on adjusting a rate-based parameter that represents a second rate associated with a timeslot of the timeslots that is assigned to a second wireless communication session associated with a second wireless device coupled to the second cellular base station device, wherein the increasing the capacity facilitates sharing of the timeslot between a first data transmission associated with the first wireless communication session and a second data transmission associated with the second wireless communication session.

11. The system of claim 10, wherein the operations further comprise:
in response to determining that the timing data does not satisfy the defined timing criterion, selecting a third cellular base station device, wherein the first wireless communication session is transferred from the first cellular base station device to the third base station device.

12. The system of claim 10, wherein the operations further comprise:
ranking the timeslots based on information indicative of a set of signal qualities of signals respectively transmitted during the timeslots.

13. The system of claim 12, wherein the operations further comprise:
selecting the timeslot from the timeslots based on a rank associated with the timeslot determined by the ranking.

14. The system of claim 10, wherein the operations further comprise:
dividing the timeslot into sub-rate timeslots, wherein a sub-rate timeslot of the sub-rate timeslots has a first bit rate that is lower than a second bit rate of the timeslot.

15. The system of claim 14, wherein the operations further comprise:
reassigning the second wireless communication session to a first set of the sub-rate timeslots.

16. The system of claim 15, wherein the operations further comprise:
assigning the first wireless communication session to a second set of the sub-rate timeslots, wherein the second set of the sub-rate timeslots is different from the first set of the sub-rate timeslots.

17. A computer readable storage device comprising executable instructions that, in response to execution, cause a system comprising a processor to perform operations, comprising:
in response to determining that a strength of a signal received from a first wireless device satisfies a rescue handover criterion, determining that a first wireless communication session associated with a first wireless device is to be transferred over from a first cellular base station device to a second cellular base station device to avoid a radio link failure associated with a radio link between the first cellular base station device and the first wireless device;
in response to the determining that the first wireless communication session is to be transferred, determining timing data representing a time period during which the first wireless communication session was previously assigned to a divided timeslot associated with a third cellular base station device, wherein the divided timeslot has a rate that has been adjusted to accommodate the first wireless communication session; and
in response to determining that the timing data satisfies a defined timing criterion and determining that timeslots of a frequency channel employed by the second cellular base station device are occupied, dividing, into a set of sub-timeslots, a timeslot of the timeslots that is assigned to a second wireless communication session associated with a second wireless device coupled to the second cellular base station device wherein a first sub-timeslot of the set of sub-timeslots is to be utilized to facilitate the first wireless communication session and a second sub-timeslot of the set of sub-timeslots is to be utilized to facilitate the second wireless communication session.

18. The computer readable storage device of claim 17, wherein the first sub-timeslot and the second sub-timeslot have respective bit rates that are lower than a bit rate of the timeslot.

19. The computer readable storage device of claim 18, wherein the operations further comprise:
in response to determining that the timing data does not satisfy the defined timing criterion, denying a transfer of the first wireless communication session from the first cellular base station device to the second cellular base station device.

20. The computer readable storage device of claim 17, wherein the operations further comprise:
based on determining information representing a network condition, facilitating an allocation of a network bandwidth between speech encoding and error protection associated with the first wireless communication session.

* * * * *